: US 10,316,139 B2
(45) Date of Patent: *Jun. 11, 2019

(12) United States Patent
Bastioli et al.

(54) ALIPHATIC-AROMATIC BIODEGRADABLE POLYESTER

(75) Inventors: Catia Bastioli, Novara (IT);
Giampietro Borsotti, Novara (IT);
Luigi Capuzzi, Novara (IT); Roberto Vallero, Borgo D'Ale (IT)

(73) Assignee: NOVAMONT S.P.A., Novara (IT)

( * ) Notice: Subject to any disclaimer, the term of this patent is extended or adjusted under 35 U.S.C. 154(b) by 0 days.

This patent is subject to a terminal disclaimer.

(21) Appl. No.: 12/991,336

(22) PCT Filed: May 7, 2009

(86) PCT No.: PCT/EP2009/055568
§ 371 (c)(1),
(2), (4) Date: Dec. 1, 2010

(87) PCT Pub. No.: WO2009/135921
PCT Pub. Date: Nov. 12, 2009

(65) Prior Publication Data
US 2011/0071238 A1 Mar. 24, 2011

(30) Foreign Application Priority Data
May 8, 2008 (IT) .............................. MI2008A0840

(51) Int. Cl.
C08L 1/02 (2006.01)
C08L 3/02 (2006.01)
C08G 63/16 (2006.01)
C08L 67/04 (2006.01)
C08L 93/00 (2006.01)
C08G 63/181 (2006.01)
C08G 63/672 (2006.01)
C08L 67/02 (2006.01)
C08J 5/18 (2006.01)

(52) U.S. Cl.
CPC .......... C08G 63/16 (2013.01); C08G 63/181 (2013.01); C08G 63/672 (2013.01); C08J 5/18 (2013.01); C08L 67/02 (2013.01); C08J 2367/02 (2013.01); C08J 2403/00 (2013.01); C08J 2467/04 (2013.01); C08L 1/02 (2013.01); C08L 3/02 (2013.01); C08L 67/04 (2013.01); C08L 93/00 (2013.01); C08L 2203/16 (2013.01); C08L 2205/02 (2013.01); C08L 2205/03 (2013.01)

(58) Field of Classification Search
CPC .... C08G 63/181; C08G 63/672; C08G 63/78; C08G 63/85; C08G 2230/00; C08G 63/12; C08G 63/199; C08G 63/6856; C08G 63/6886; C08G 63/80; C08G 63/914; C08G 63/16; C08L 67/02; C08L 2666/02; C08L 2666/18; C08L 1/02; C08L 2203/16; C08L 2205/02; C08L 2205/03; C08L 3/02; C08L 67/04; C08L 93/00; Y10T 428/1352; Y10T 428/1397; Y10T 428/249953; C08J 2367/02; C08J 2403/00; C08J 2467/04; C08J 5/18
USPC ................................................... 528/302, 304
See application file for complete search history.

(56) References Cited

U.S. PATENT DOCUMENTS

| 2,551,731 A | 5/1951 | Drewitt |
| 6,342,300 B1 | 1/2002 | Bengs et al. |
| 8,143,355 B2 | 3/2012 | Matsuda et al. |
| 2008/0103340 A1 | 5/2008 | Binder et al. |
| 2010/0021509 A1 | 1/2010 | Matsumoto et al. |
| 2012/0219740 A1* | 8/2012 | Bastioli et al. ............. 428/35.7 |

FOREIGN PATENT DOCUMENTS

| CA | 2324279 A1 | 9/1999 |
| EP | 1882712 A1 | 1/2008 |
| GB | 789809 A | 1/1958 |
| JP | 2002-505359 A | 2/2002 |
| JP | 2007-146153 A | 6/2007 |
| JP | 2007-232089 A | 9/2007 |
| JP | 2008-114113 A | 5/2008 |
| JP | 2008-115161 A | 5/2008 |
| WO | WO-03/089493 A1 | 10/2003 |
| WO | WO-2005/092948 A2 | 10/2005 |
| WO | WO 2006/097353 * | 9/2006 |

(Continued)

OTHER PUBLICATIONS

C.Okkerse et al."From fossil to green", Green Chemistry, Apr. 1999, pp. 107-114.*

(Continued)

Primary Examiner — Ling Siu Choi
Assistant Examiner — Gennadiy Mesh
(74) Attorney, Agent, or Firm — Polsinelli PC

(57) ABSTRACT

Disclosed are aliphatic-aromatic biodegradable polyesters obtained from aliphatic dicarboxylic acids, polyfunctional aromatic acids of renewable origin and particularly 2,5-furan dicarboxylic acid, and diols. Also disclosed are blends of the polyesters with other biodegradable polymers of either natural or synthetic origin. The polyesters have properties and viscosity values that make them suitable, after adjusting their molecular weight, for use in numerous practical applications such as films, injection molded products, extrusion coatings, fibers, foams, thermoformed products, extruded profiles and sheets, extrusion blow molding, injection blow molding, rotomolding, stretch blow molding.

21 Claims, 1 Drawing Sheet

(56) References Cited

FOREIGN PATENT DOCUMENTS

| WO | WO-2006/097353 A1 | 9/2006 |
| WO | WO-2006/097354 A1 | 9/2006 |
| WO | WO-2007/052847 A1 | 5/2007 |
| WO | WO-2009135921 A1 | 11/2009 |

OTHER PUBLICATIONS

Medvedeva et al. "Mixed polyesters of ethylene glycol with 2,5-furandicarboxylic and terephthalic acids" Soviet Plastics, Feb. 1963, pp. 14-15.*

Gandini et al. "Furans in polymer chemistry", 1997.*

Manasek "Modified fiber-forming polyesters from 2,5-furandicarboxylic acid", 1968,pp. 35-38, Article.*

Manasek "Modified fiber-forming polyesters from 2,5-furandicarboxylic acid", 1968,pp. 35-38, Abstract.*

Th. Rieckmann Modern Polyesters Chapter 2. Poly(Ethylene Terephthalate) Polymerization—Abstract,Published Online: Jun. 21, 2004.*

Th. Rieckmann Modern Polyesters Chapter 2. Poly(Ethylene Terephthalate) Polymerization—Article,Published Online: Jun. 21, 2004.*

Witt et al "Biodagradable Polymeric Materials.." Angew.Chem.Int. 1999, 38,No. 10.*

Manasek Z, "Modification of a Fibre-forming Polyester Based on 2,5-Furandicarboxylic Acid"—Research, vol. 6, No. 677.46, 1968, 35-38.

Werpy T et al., "Top Value Added Chemicals from Biomass: vol. 1—Results of Screening for Potential Candidates from Sugars and Synthesis Gas" Report, Aug. 1, 2004.

Roman-Leshkiv, Yuriy et al., "Phase Modifiers Promote Efficient Production of Hydroxymethylfurfural from Fructose", Science, vol. 312, Jun. 30, 2006, 1933-1937.

Ribeiro Marcelo et al., "Synthesis of 2,5-furandicarboxylic acid from fructose: a suitable precursor for biopolymers", Natural Polymers and Composite IV, 2002, 192-197.

* cited by examiner

ALIPHATIC-AROMATIC BIODEGRADABLE POLYESTER

CROSS REFERENCE TO RELATED APPLICATIONS

This application is a National Phase filing under 35 U.S.C. § 371 of PCT/SE2009/055568 filed on May 7, 2009; and this application claims priority to Application No. MI2008A000840 filed in Italy on May 8, 2008 under 35 U.S.C. § 119; the entire contents of all are hereby incorporated by reference.

The present invention refers to aliphatic-aromatic biodegradable polyesters obtained from aliphatic dicarboxylic acids, polyfunctional aromatic acids of renewable origin and diols; it also refers to blends of said polyesters with other biodegradable polymers of either natural or synthetic origin.

Aliphatic-aromatic biodegradable polyesters obtained starting from terephthalic acid and dialcohols are known in the literature and on the market. The presence of the aromatic component in the chain is important to obtain polymers with a high enough melting temperature and a suitable crystallisation rate.

Still the terephthalic acid is of synthetic origin and its potential production from renewable sources is excessively complex. This restricts the chances of significantly reducing the environmental impact of the polyesters of this type currently on the market in terms of the non-renewable-carbon feedstock involved, despite their biodegradability.

Furthermore, although an increase of the terephthalic acid content improves the mechanical and thermal properties of the aliphatic-aromatic polyesters, its high content decreases the percentage of biodegradation of said polyesters. Consequently, were it possible to maintain suitable biodegradation properties and performance in use, the presence of high percentages of aromatic acid of renewable origin in the chain would be desirable. Indeed, this would enable a polymer with high mechanical and thermal properties to be obtained from a feedstock deriving from a renewable source accounting for a very large proportion of the total carbon, that could even be as high as 100% of the total carbon. In fact, the use of monomers of vegetable origin contributes to a reduction of the $CO_2$ in the atmosphere and to a more limited use of non-renewable resources.

All the above identified drawbacks are now overcome by the polyesters according to the present invention.

In fact, the present invention refers to biodegradable polyesters of aliphatic-aromatic type obtained starting from aliphatic dicarboxylic acids, polyfunctional aromatic acids from renewable sources and diols.

The products that can be considered of renewable origin are those obtained from sources that, by their very nature, are regenerable and inexhaustible on the time scale of human life and the use of which consequently does not negatively affect the availability of natural resources for future generations. A typical example of a renewable resource consists of vegetable crops.

As concerns the aliphatic dicarboxylic acids, those considered here are the $C_2$-$C_{22}$ dicarboxylic acids.

Among the aliphatic dicarboxylic acids, adipic acid and those of renewable origin are particularly preferred and, among the latter, the aliphatic dicarboxylic acids of renewable origin $C_8$-$C_{13}$ are particularly preferred, and especially suberic acid, azelaic acid, sebacic acid and brassylic acid, and their esters. Blends of these acids are also particularly interesting.

There are also the diacids with insaturations inside the chain, such as itaconic acid and maleic acid.

By polyfunctional aromatic acids according to the present invention, it is meant the dicarboxylic aromatic compounds from renewable sources and their esters; 2,5 furandicarboxylic acid and its derivatives are particularly preferred.

The polyfunctional aromatic acid content in the biodegradable polyesters according to the present invention preferably is comprised between 90% and 5%, and more preferably between 80% and 10%, or better still between 70% and 20%, and even better between 60% and 40% mol of the total moles of dicarboxylic acids.

Examples of diols according to the present invention include: 1,2-ethanediol, 1,2-propanediol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,4-cyclohexanedimethanol, propylene glycol, neopentyl glycol, 2-methyl-1,3-propanediol, dianhydrosorbitol, dianhydromannitol, dianhydroiditol, cyclohexanediol, cyclohexane-methanediol, aromatic diols such as phenols, and furan diol.

Among the diols according to the present invention, those having the two hydroxyl groups in alpha-omega positions are preferred. Thanks to their molecular structure said alpha-omega diols promote the three-dimensional order of the polymer chains which results in the good degree of crystallinity of the polyester according to the present invention.

BEST AND VARIOUS MODES FOR CARRYING DISCLOSURE

Figure 1A:
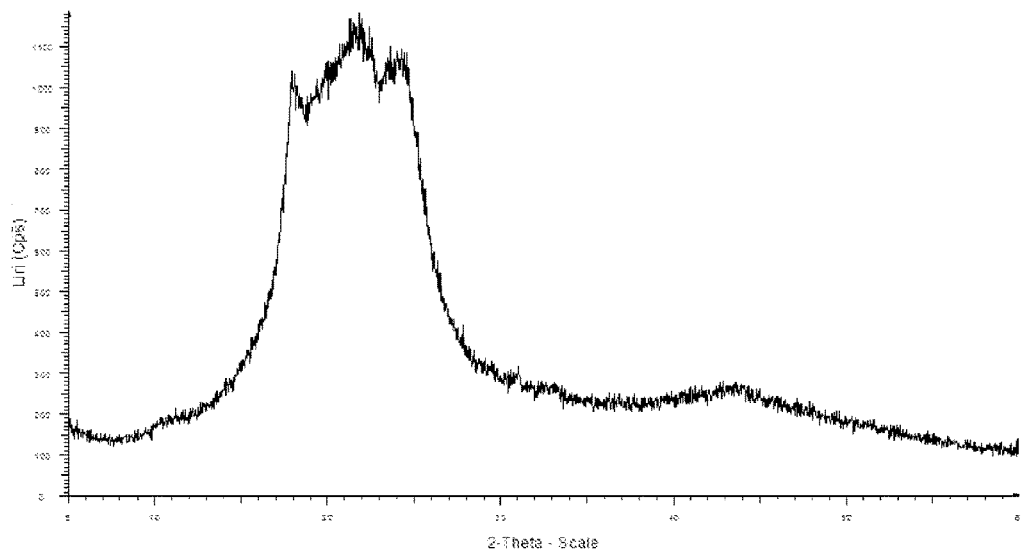
FIG. 1A shows the X-ray diffractogram of the polymer of Example 1.

Those particularly preferred are the diols of type $C_2$-$C_{10}$. The $C_2$-$C_4$ diols are even more preferable.

The molecular weight $M_n$ of the polyester according to the present invention preferably is comprised between 5,000 and 150,000, and even more preferably between 10,000 and 120,000, or better still between 20,000 and 100,000. The polydispersity index $M_w/M_n$ is comprised between 1.4 and 8, and preferably between 1.6 and 5.

The polyesters according to the invention preferably show a crystallinity greater than 5%, preferably greater than 8%, more preferably greater than 10% as measured by X-ray diffractometry for example using a Philips X'Pert θ/2θ diffractometer with a Bragg-Brentano geometry, using X Cu $K_\alpha$ radiation with λ=1.5416 angstrom and operating power 1.6 kW. The angular range used is 5-60° (2θ) with steps of 0.03° (2θ) and acquisition time of 2 seconds per step. The % of crystallinity is calculated as the percentage between the crystalline phase area and the sum of the areas of crystalline and amorphous phases.

The polyesters according to the invention have an inherent viscosity (measured with an Ubbelhode viscometer for solutions in $CHCl_3$ at a concentration of 0.2 g/dl at 25° C.) that is comprised between 0.3 and 2 dl/g, and preferably between 0.7 and 1.5 dl/g, or better still between 0.85 and 1.2 dl/g.

The melt flow rate (MFR) of the polyesters according to the invention, in the case of their use in typical applications for plastic materials (including, for instance, bubble film processing, injection moulding, foaming, etc.), is comprised between 0.5 and 300 g/10 min, and preferably between 1 and 100 g/10 min, and even more preferably between 1.5 and 70 g/10 min, or better still between 2.0 and 50 g/10 min (measured at 190° C./2.16 kg in accordance with the ASTM standard D1238).

In addition to the basic monomers, the polyesters according to the invention can contain at least one hydroxy acid in quantities coming between 0% and 49%, and preferably between 0% and 30% mol of the total moles of aliphatic dicarboxylic acid. Examples of suitable hydroxy acids include: glycolic acid, hydroxybutyric acid, hydroxycaproic acid, hydroxyvaleric acid, 7-hydroxyheptanoic acid, 8-hydroxycaproic acid, 9-hydroxynonanoic acid, lactic acid or lactide. The hydroxy acids can be inserted in the chain in their natural state, or they can be made to react beforehand with diacids or diols. The hydroxyl acid units can be inserted randomly in the chain or can form blocks of adjacent units.

The polymers according to the invention can contain terminal unsaturations. Said terminal unsaturations can be generated through controlled degradation during the polymerization phase or during processing of the polymer precursor, or through the addition of suitable unsaturated monomers.

With controlled degradation is meant a thermal treatment during which the polymer is maintained above its melting temperature in a closed environment for the time necessary to generate the unsaturations.

Long-chain difunctional molecules, even with functionalities that are not in a terminal position, can also be added in quantities no greater than 10%; examples of these include dimer acids, ricinoleic acid and acids with epoxidic functions.

There may also be amines, amino acids and in alcohols accounting for up to 30% mol of the total molecular weight of all the other components.

In the process for preparing the co-polyester according to the invention, one or more polyfunctional molecules may be advantageously added in quantities coming between 0.1 and 3% mol of the total molecular weight of the carboxylic acids (and any hydroxy acids), in order to obtain branched products. Examples of these molecules include glycerol, pentaerythritol, trimethylolpropane, citric acid, dipentaerythritol, monoanhydrosorbitol, monohydromannitol, epoxidized oils such as epoxidized soybean oil, epoxidized linseed oil and so on, and acid triglycerides.

Although the polymers according to the present invention achieve an excellent performance without any need to add chain extenders such as isocyanates and isocyanides, epoxides, and particularly polyepoxides, oxazolines or carbodiimides, it is nonetheless possible to modify their properties as the case may require.

Generally such additives are used in percentages comprised between 0.01-2%, preferably 0.05-1.5%, by weight.

Examples of epoxides that can advantageously be used are all polyepoxides from epoxidized oils and/or from styrene—glycidyl ether-methylmetacrylate, glycidyl ether methylmetacrylate included in a range of molecular weights between 1,000 and 10,000 and with a number of epoxides per molecule ranging from 1 to 30 and preferably from 5 to 25, and epoxides selected from the group comprising: diethylene glycol diglycidyl ether, polyethylene glycol diglycidyl ether, glycerol polyglycidyl ether, diglycerol polyglycidyl ether, 1,2-epoxybutane, polyglycerol polyglycidyl ether, isoprene diepoxide, and cycloaliphatic diepoxide, 1,4-cyclohexanedimethanol diglycidyl ether, glycidyl 2-methylphenyl ether, glycerol propoxylate triglycidyl ether, 1,4-butanediol diglycidyl ether, sorbitol polyglycidyl ether, glycerol diglycidyl ether, tetraglycidyl ether of meta-xylenediamine, diglycidyl ether of bisphenol A and diglycidyl ether of bisphenol F, and mixtures thereof.

Catalysts can also be used to increase the reactivity of the reactive groups. In the case of polyepoxides, salts of fatty acids can, for example, be used. Calcium and zinc stearates are particularly preferred.

Preferably, the epoxides are added to the polyesters according to the invention in a quantity comprised between 0.1-1.5% more preferably 0.2-0.8% by weight.

Examples of carbodiimides that can advantageously be used are selected from the group comprising: poly(cyclooctylene carbodiimide), poly(1,4-dimethylene cyclohexylene carbodiimide), poly(cyclohexylene carbodiimide, poly(ethylene carbodiimide), poly(butylene carbodiimide), poly(isobutylene carbodiimide), poly(nonylene carbodiimide), poly(dodecylene carbodiimide), poly(neopentylene carbodiimide), poly(1,4-dimethylene phenylene carbodiimide), poly(2,2',6,6', tetra-isopropyl-diphenylene carbodiimide), (Stabaxol® D), poly(2,4,6-triisopropyl-1,3-phenylene carbodiimide) (Stabaxol® P-100), poly(1,3,5-triisopropyl-phenylene-2,4-carbodiimide), poly(2,6 diisopropyl-1,3-phenylene carbodiimide) (Stabaxol® P), poly(tolyl carbodiimide), poly(4,4'-diphenylmethane carbodiimide), poly(3,3'-dimethyl-4,4'-biphenylene carbodiimide), poly(p-phenylene carbodiimide), poly(m-phenylene carbodiimide), poly(3,3'-dimethyl-4,4'-diphenylmethane carbodiimide), poly(naphthylene carbodiimide), poly(isophorone carbodiimide), poly(cumene carbodiimide), p-phenylene bis(ethylcarbodiimide), 1,6-hexamethylene bis(ethylcarbodiimide), 1,8-octamethylene bis(ethylcarbodiimide), 1,10-decamethylene bis(ethylcarbodiimide), 1,12 dodecamethylene bis (ethylcarbodiimide) and mixtures thereof.

Preferably, said chain extenders are added to the polyesters according to the invention in a quantity of 0.05-0.8%, more preferably 0.1-0.5% by weight.

An increase in the molecular weight of the polyesters can be advantageously obtained, for instance, by adding various organic peroxides during the extrusion process. The increase in the molecular weight of the biodegradable polyesters is easily detectable on observing the increase in the viscosity values after processing the polyesters with the peroxides.

Examples of peroxides that can advantageously be used are selected from the group of dialkyl peroxides, such as: benzoyl peroxide, lauroyl peroxide, isononanoyl peroxide, di-(t-butylperoxyisopropyl)benzene, t-butyl peroxide, dicumyl peroxide, alpha,alpha'-di(t-butylperoxy)diisopropylbenzene, 2,5-dimethyl-2,5 di(t-butylperoxy)hexane, t-butyl cumyl peroxide, di-t-butylperoxide, 2,5-dimethyl-2,5-di(t-butylperoxy)hex-3-yne, di(4-t-butylcyclohexyl)peroxydicarbonate, dicetyl peroxydicarbonate, dimyristyl peroxydicarbonate, 3,6,9-triethyl-3,6,9-trimethyl-1,4,7-triperoxonan, di(2-ethylhexyl)peroxydicarbonate and mixtures thereof.

Preferably, said peroxides are added to the polyesters according to the invention in a quantity of less than 0.5%, more preferably of 0.01-0.2% and even more preferably of 0.01-0.1% by weight.

The polyesters according to the invention have properties and viscosity values that make them suitable, after adjusting their molecular weight, for use in numerous practical applications such as films, injection moulded products, extrusion coatings, fibres, foams, thermoformed products, extruded profiles and sheets, extrusion blow molding, injection blow molding, rotomolding, stretch blow molding etc.

In case of films, production technologies like film blowing, casting, and coextrusion can be used.

Films obtained with the polyester according to the present invention show excellent mechanical properties, such as for example an ultimate elongation greater than 350%, preferably greater than 400%, more preferably 500% and an ultimate energy greater than 70 MJ/m$^3$, preferably greater than 90 MJ/m$^3$ and more preferably 100 MJ/m$^3$.

Moreover, such films can be subject to bioriention in line or after film production. The films can be also oriented through stretching in one direction with a stretching ratio from 1:2 up to 1:15, more preferably from 1:2.2 up to 1:8. It is also possible that the stretching is obtained in presence of an highly filled material with inorganic fillers. In such a case, the stretching can generate microholes and the so obtained film can be particularly suitable for hygiene applications.

In particular, the polyesters according to the invention are suitable for manufacturing:
- mono- and bi-oriented films, and films multilayered with other polymers;
- films for use in the agricultural sector, such as films for use in mulching;
- cling films for use with foodstuffs, for bales in agriculture, and for wrapping waste;
- shrink film such as for example for pallets, mineral water, six pack rings, and so on;
- bags and bin liners for the organic waste collection, e.g. the collection of food scraps and gardening waste;
- thermoformed foodstuff packaging, both mono- and multi-layered, as in containers for milk, yoghurt, meats, beverages, etc;
- coatings obtained using the extrusion coating method;
- multilayer laminates with rigid or flexible backings such as for example paper, plastic, aluminium, or metallic films;
- foamed or foamable beads for the production of pieces obtained by sintering;
- foamed and semi-foamed products, including foamed blocks formed using pre-expanded articles;
- foamed sheets, thermoformed foam sheets, and containers obtained from them for use in foodstuff packaging;
- fruit and vegetable containers in general;
- composites with gelatinised, destructured and/or complexed starch, natural starch, flours, other fillers of natural, vegetal or inorganic origin;
- fibres, microfibres, composite fibres with a core consisting of rigid polymers, such as PLA, PET, PTT etc., and an external shell made using the material according to the invention, dablens composite fibres, fibres with different cross sections, from round to multilobed, fibres in flakes, woven and nonwoven, or spun-bonded or thermobonded fabrics for use in sanitary and hygiene products, and in the agricultural and clothing sectors.

Other uses may also include applications in which the polyesters are used in lieu of plastic-coated PVC.

The polyesters according to the invention can be used in blends too, obtained also by means of reactive extrusion, both with polyesters of the same type (such as aliphatic/aromatic copolyesters as for example polybutylene terephthalate-co-sebacate, polybutylene terephthalate-co-azelate, polybutylene terephthalate-co-brassilate, polybutylene terephthalate-co-adipate, polybutylene terephthalate-co-succinate and polybutylene terephthalate-co-glutarate) and with other biodegradable polyesters (e.g. poly-L-lactic acid, poly-D-lactic acid and stereo-complexed polylactic acid, poly-ε-caprolactone, polyhydroxybutyrates such as polyhydroxybutyrate valerate, polyhydroxybutyrate propanoate, polyhydroxybutyrate hexanoate, polyhydroxybutyrate decanoate, polyhydroxybutyrate dodecanoate, polyhydroxybutyrate hexadecanoate, polyhydroxybutyrate octadecanoate, polyalkylene succinates, poly-3-hydroxybutyrate, 4-hydroxybutyrate, polysuccinates and particularly polybutylene succinate and its copolymers with adipic acid and lactic acid) or polymers other than polyesters.

Blends of the polyesters with polylactic acid are particularly preferred.

The polyesters according to the invention can also be used in blends, such blends being obtainable by means of reactive extrusion too, with polymers of natural origin, such as starch, cellulose, chitin and chitosan, alginates, proteins such as gluten, zein, casein, collagen, gelatine, natural rubbers, rosinic acid and its derivatives, lignins and their derivatives, natural fibers (such as for example jute, kenaf, hemp). The starches and celluloses may be modified and may include, for instance, the starch and cellulose esters with a degree of substitution coming between 0.2 and 2.5, hydroxypropylated starches, and modified starches with fatty chains. Starch can also be used in either destructurized or gelatinised form, or as a filler. The starch may represent the continuous or the dispersed phase, or it may be in co-continuous form. In the case of dispersed starch, the starch particles have mean dimension of less than 1μ, and preferably less than 0.5μ.

With regard to the starch particles dimension, these are measured in the transverse direction with respect to the direction of the extrusion flow or, anyhow, with respect to the direction of the material's output. The dimension of a starch particle is therefore measured on the bidimensional shape resulting from the transverse direction. The mean dimension is calculated as the numeral (or arithmetic) average of the particle diameters.

In case of a spherical particle the particle diameter corresponds to the diameter of the smaller circle in which the particle can be inscribed.

In case of a non-spherical particle the particle diameter (d) is calculated according to the following formula $$d=\sqrt{d_1 \cdot d_2}$$

where $d_1$ is the minor diameter and $d_2$ is the major diameter of the ellipse in which the particle can be inscribed or approximated.

Mixtures of polyesters according to the invention wherein starch represents the dispersed phase can form biodegradable polymeric compositions with good-resistance to ageing and to humidity. Indeed, these polymeric compositions can maintain a high tear strength even in condition of low humidity.

Such characteristics can be achieved when the water content of the composition during mixing of the component is preferably kept between 1% and 15% by weight. It is, however, also possible to operate with a content of less than 1% by weight, in this case, starting with predried and pre-plasticized starch.

It could be useful also to degrade starch at a low molecular weight before or during compounding with the polyesters of the present invention in order to have in the final material or finished product a starch inherent viscosity between 1 and 0.2 dl/g, preferably between 0.6 and 0.25 dl/g, more preferably between 0.55 and 0.3 dl/g.

Desctructurized starch can be obtained before or during mixing with the polyesters according to the present invention in presence of plasticizerrs such as water, glycerol, di and poly glycerols, ethylene or propylene glycol, ethylene and propylene diglycol, polyethylene glycol, polypropylenglycol, 1,2 propandiol, trymethylol ethane, trymethylol propane, pentaerytritol, dipentaerytritol, sorbitol, erytritol, xylitol, mannitol, sucrose, 1,3 propanediol, 1,2 butanediol, 1,3 butanediol, 1,4 butanediol, 1,5 pentanediol, 1,5 hexanediol, 1,6 hexanediol, 1,2,6 hexanetriol, 1,3,5 hexanetriol, neopentyl glycol and polyvinyl alcohol prepolymers and polymers, polyols acetates, ethoxylates and propoxylates, particularly sorbitol ethoxylate, sorbitol acetate, and pentaerythritol acetate. The quantity of high boiling point plasticizers (plasticizers different from water) used are generally from 0% to 50%, preferably from 10% to 30% by weight, relative to the starch.

Water can be used as a plasticizer in combination with high boiling point plasticizers or alone during the plastification phase of starch before or during the mixing of the composition and can be removed at the needed level by degassing on one or more steps during extrusion. Upon completion of the plastification and mixing of the components, the water is removed by degassing to give a final content of about 0.2-3% by weight.

Water, as well as high-boiling point plasticizers, modifies the viscosity of the starch phase and affects the rheological properties of the starch/polymer system, helping to determine the dimensions of the dispersed particles. Compatibilizers can be also added to the mixture. They can belong to the following classes:

Additives such as esters which have hydrophilic/lipophilic balance index values (HLB) greater than 8 and which are obtained from polyols and from mono or polycarboxylic acids with dissociation constants pK lower than 4.5 (the value relates to pK of the first carboxyl group in the case of polycarboxylic acids)

Esters with HLB values of between 5.5 and 8, obtained from polyols and from mono or polycarboxylic acids with less than 12 carbon atoms and with pK values greater than 4.5 (this value relates to the pK of the first carboxylic group in the case of polycarboxylic acids)

Esters with HLB values lower than 5.5 obtained from polyols and from fatty acids with 12-22 carbon atoms.

These compatibilizers can be used in quantities of from 0.2 to 40% weight and preferably from 1 to 20% by weight related to the starch. The starch blends can also contain polymeric compatibilizing agents having two components: one compatible or soluble with starch and a second one soluble or compatible with the polyester.

Examples are starch/polyester copolymers through transesterification catalysts. Such polymers can be generated trough reactive blending during compounding or can be produced in a separate process and then added during extrusion. In general block copolymers of an hydrophilic and an hydrophobic units are particularly suitable. Additives such as di and polyepoxides, di and poly isocyanates, isocyanurates, polycarbodiimmides and peroxides can also be added. They can work as stabilizers as well as chain extenders.

All the products above can help to create the needed microstructure.

It is also possible to promote in situ reactions to create bonds between starch and the polymeric matrix. Also aliphatic-aromatic polymers chain extended with aliphatic or aromatic diisocyanates or di and polyepoxides or isocyanurates or with oxazolines with intrinsic viscosities higher than 1 dl/g or in any case aliphatic—aromatic polyesters with a ratio between Mn and MFI at 190° C., 2.16 kg higher than 10 000, preferably higher than 12 500 and more preferably higher than 15 000 can also be used to achieve the needed microstructure.

Another method to improve the microstructure is to achieve starch complexation in the starch-polyester mixture.

In this connection the content of EP 965 615 has to be intended as incorporated by reference in the present description. In such a case, in the X-Ray spectra of the compositions with the polyester according to the present invention, the Hc/Ha ratio between the height of the peak (Hc) in the range of 13-14° of the complex and the height of the peak (Ha) of the amorphous starch which appears at about 20.5° (the profile of the peak in the amorphous phase having been reconstructed) is less than 2 and greater than 0.02.

The starch/polyester ratio is comprised in the range 5/95% weight up to 60/40% by weight, more preferably 10/90-45/55% by weight.

In such starch-based blends in combination with the polyesters of the present invention it is possible to add polyolefins, polyvinyl alcohol at high and low hydrolysis degree, ethylene vinylalcohol and ethylene vinylacetate copolymers and their combinations as well as aliphatic polyesters such as poly butylenesuccinate, polybutyleneesuccinate adipate, polybutyleneesuccinate adipate-caprolactate, polybutyleneesuccinate-lactate, polycaprolactone polymers and copolymers, PBT, PET, PTT, polyamides, polybutylene terephthalate adipates with a content of terephthalic acid between 40 and 70% with and without sulfonated groups with or without branches and possibly chain extended with diisocianates or isocianurates, polyurethanes, polyamide-urethanes, cellulose and starch esters such as acetate, propionate and butyrate with substitution degrees between 1 and 3 and preferably between 1.5 and 2.5, polyhydroxyalkanoates, poly L-lactic acid, poly-D lactic acid and lactides, their mixtures and copolymers.

The starch blends of the polyesters of the present invention can be easily processable in film blowing even at MFI (170° C., 5 kg) of 7 g/10 min. Moreover they have impact strength higher than 20 $kJ/m^2$, preferably higher than 30 $kJ/m^2$ and most preferably higher than 45 $kJ/m^2$ (measured on blown film 30 µm thick at 10° C. and less then 5% relative humidity).

Particularly resistant and easily processable compounds contain destructurized starch in combination with the polyesters of the invention and polylactic acid polymers and copolymers with and without additives such as polyepoxydes, carbodiimmides and/or peroxides.

The starch-base films can be even transparent in case of nanoparticles of starch with dimensions lower than 500 µm and preferably lower than 300 µm. It is also possible to go from a dispersion of starch in form of droplets to a dispersion in which two co-continuous phases coexist and the blend is characterized for allowing a higher water content during processing.

In general, to obtain co-continuous structures it is possible to work either on the selection of starch with high amylopectine content and/or to add to the starch-polyester compositions block copolymers with hydrophobic and hydrophilic units. Possible examples are polyvinylacetate/polyvinylalcohol and polyester/polyether copolymers in which the block length, the balance between the hydrophilicity and hydrophobicity of the blocks and the quality of compatibilizer used can be suitably changed in order to finely adjust the microstructure of the starch-polyester compositions.

The polymers according to the invention can also be blended with polyolefins, such as polyethylene, polypropylene and their copolymers, polyvinyl alcohol, polyvinyl acetate, polyethyl vinyl acetate and polyethylene vinyl alcohol, polyester urethanes, polyurethanes, polyamides, polyureas and aromatic polyesters of the diacid diol type wherein the aromatic acid is 2,5 furandicarboxylic acid.

The polymers according to the invention can also be used as prepolymers in the production of polyurethanes and polyureas.

The blends of the polyesters with starch are particularly preferred.

The polyesters according to the invention can also be used in blends with polymers of synthetic origin and with the previously-mentioned polymers of natural origin.

Binary and ternary blends of the polyester according to the present invention with biodegradable polyesters of the type disclosed above and/or with polymers of natural origin are particularly suitable for the production of films. Advantageously, the films obtained with said blends show excellent mechanical properties.

Mixtures of the polyesters with starch and polylactic acid are particularly preferred.

Blends of the polyesters according the present invention with PLA are of particular interest because their high compatibility with PLA polymers and copolymers permits to cover materials with a wide range of rigidities—which makes these blends particularly suitable for injection molding and extrusion.

Moreover, blends of such polyesters with poly L-lactic acid and poly D-lactic acid or poly L-lactide and D-lactide where the ratio between poly L- and poly D-lactic acid or lactide is in the range 10/90-90/10, preferably 20/80-80/20, and the ratio between aliphatic-aromatic polyester and the polylactic acid or PLA blend is in the range 5/95-95/5, preferably 10/90-90/10, are of particular interest for the high thermal resistance. Polylactic acid or lactide polymers or copolymers are generally of molecular weight Mn in the range between 30000 and 300000, more preferably between 50000 and 250000.

To improve the transparency and toughness of such blends and decrease or avoid a lamellar structure of polylactide polymers, it is possible to introduce other polymers as compatibilizers or toughening agents such as: polybutylene succinate and copolymers with adipic acid and or lactic acid and or hydroxyl caproic acid, polycaprolactone, aliphatic polymers of diols from $C_2$ to $C_{13}$ and diacids from $C_4$ to $C_{13}$, polyhydroxyalkanoates, polyvinylalcohol in the range of hydrolysis degree between 75 and 99% and its copolymers, polyvinylacetate in a range of hydrolysis degree between 0 and 70%, preferably between 0 and 60%. Particularly preferred as diols are ethylene glycol, propanediol, butanediol and as acids: azelaic, sebacic, undecandioic acid, dodecandioic acid, brassylic acid and their combinations.

To maximize compatibility among the polyesters of the invention and polylactic acid it is very useful the introduction of copolymers with blocks having high affinity for the aliphatic-aromatic copolyesters of the invention, and blocks with affinity for the lactic acid polymers or copolymers. Particularly preferred examples are block copolymers of the aliphatic aromatic copolymers of the invention with polylactic acid. Such block copolymers can be obtained taking the two original polymers terminated with hydroxyl groups and then reacting such polymers with chain extenders able to react with hydroxyl groups such as diisocyanates Examples are 1,6 hexamethylene diisocyanate, isophorone diisocyanate, methylene diphenildiisocyanate, toluene diisocyanate or the like. It is also possible to use chain extenders able to react with carboxylic groups like di and poly epoxides (e.g. bisphenols diglycidyl ethers, glycerol diglycidyl ethers) divinyl derivatives if the polymers of the blend are terminated with acid groups. It is possible also to use as chain extenders carbodiimmides, bis-oxazolines, isocyanurates etc.

The intrinsic viscosity of such block copolymers can be between 0.3 and 1.5 dl/g, more preferably between 0.45 and 1.2 dl/g. The amount of compatibilizer in the blend of aliphatic-aromatic copolyesters and polylactic acid can be in the range between 0.5 and 50%, more preferably between 1 and 30%, more preferably between 2 and 20% by weight.

The polyesters according to the present invention can advantageously be blended also with nucleating agents and filler both of organic and inorganic nature.

Examples of nucleating agents include talc, saccharine sodium salt, calcium silicate, sodium benzoate, calcium titanate, boron nitride, zinc salts, porphyrin, chlorine, phlorin, porphodimethine, porphomethine, bacteriochlorin, isobacteriochorin, porphyrinogen, phorbin, isotactic polypropylene, PLA with low molecular weight and PBT.

The preferred amount of fillers is in the range of 0.5-70% by weight, preferably 5-50% by weight.

As regards organic fillers, wood powder, proteins, cellulose powder, grape residue, bran, maize husks, compost, other natural fibres, cereal grits with and without plasticizers such as polyols can be mentioned.

As regards inorganic fillers, it can be mentioned substances that are able to be dispersed and/or to be reduced in lamellas with submicronic dimensions, preferably less than 500 ntn, more preferably less than 300 nm, and even more preferably less than 50 nm. Particularly preferred are zeolites and silicates of various kind such as wollastonites, montmorillonites, hydrotalcites also functionalised with molecules able to interact with starch and or the specific polyester. The use of such fillers can improve stiffness, water and gas permeability, dimensional stability and maintain transparency.

The biodegradable polyesters according to the invention are biodegradable according to the standard EN 13432.

The process for producing the polyesters according to the present invention can be conducted using any of the known processes according to the state of the art. In particular, the polyesters can be advantageously obtained using a polycondensation reaction. The copolyester polymerisation process can be advantageously conducted in the presence of a suitable catalyst. An example of a suitable catalyst might be the organometallic compounds of tin such as the derivatives of stannoic acid, or the compounds of titanium such as orthobutyl titanate, or the compounds of aluminium such as Al-triisopropyl, or of antimony and zinc.

The invention is now illustrated by describing several embodiments, which shall be intended as nonlimiting examples of the inventive concept protected by the present patent.

EXAMPLE 1

Synthesis of Poly(Butylene Furandicarboxylate-Co-Butylene Sebacate) with 60% of Aromatic Units The following were loaded in a 100 ml balloon with two necks fitted with a sealed mechanical agitator and a water cooler connected to a graduated test tube for collecting the distillate:

dimethyl ester of 2,5-furandicarboxylic acid (DMFD): 5.15 g (0.0280 moles)
sebacic acid: 3.77 g (0.0187 moles)
1,4-butanediol: 5.88 g (0.0654 moles)

Esterification Phase

The balloon was immersed in a thermostatically-controlled oil bath at a temperature of 200° C. and stirred continuously at 400 RPM.

Water and methanol are distilled during the reaction. Distillation was left to proceed for one hour, after which 100 ppm of tetraorthobutyl titanate (Tyzor®, marketed by DuPont) were added as an esterification catalyst and the temperature of the oil bath was gradually raised to 235° C. over the course of three hours. The conversion achieved, calculated as the ratio between the quantity of distillates retrieved during the reaction vis-à-vis the quantity theoretically obtainable was approximately 82%.

Polycondensation Phase

The water cooler was subsequently replaced with an air cooler fitted with a coded and graduated test-tube for the collection of the distillates and a further 1000 ppm of Tyzor® were added as the polycondensation catalyst. The pressure was reduced to 1 mbar over a period of approximately 10 minutes.

The reaction was protracted for 2 hours, bringing the temperature of the oil up to 240° C.

A product was obtained with an inherent viscosity measured in chloroform at 25° C. (2 g/l) according to the ASTM standard D 2857-89 equating to 1.06 dl/g.

The product was analysed with a Perkin Elmer DSC7 scanning differential colorimeter, obtaining the following results:
$T_m$=104° C., $T_c$=39° C.,
$\Delta H_f$=19.0 J/g,
$\Delta H_c$=−13.6 J/g,
$T_g$=−18° C.

The $^1$H-NMR analysis (at 300 MHz) on the solution in CDCl$_3$ confirmed the content of aromatic units (59.9%) and a randomness index of 1.16.

The product was analysed by gel permeation chromatography (Agilent® 1100) using a refraction index detector. The eluent consisted of CHCl$_3$ with a flow of 1 ml/min. The system was thermostat-controlled at 40° C. A set of three columns in series was used, with a particle diameter of 5μ and a porosity of 500 Å, 1,000 Å and 10,000 Å, respectively.

The molecular weight was determined using polystyrene as a reference standard.

GPC trace: Mn=68784, Mw=129690 Mz=226090 Mw/Mn=1.8854.

The polyester showed a crystallinity of 13% as measured by x ray diffractometry. FIG. 1a shows the x ray diffractogram of the polymer.

The polymer was subsequently characterised in as much as concerned with mechanical properties according to the ASTM D638 standard. The tearing resistance is measured according to the standard ASTM D1922-89.

Mechanical properties under tensile stress:

| Yield stress (MPa) | 5.5 |
| Ultimate load (MPa) | 33.5 |
| Yield elongation (%) | 30 |
| Ultimate elongation (%) | 950 |
| Elastic modulus (MPa) | 65 |
| Ultimate energy (MJ/m³) | 165 |
| Tearing resistance | |
| Elmendorf (N/mm) | >65 |

EXAMPLE 2

Synthesis of Poly(Butylene Furandicarboxylate-Co-Butylene Sebacate) with 70% of Aromatic Units The Process of Example 1 was Repeated with the Following Composition:

dimethyl ester of 2,5-furandicarboxylic acid (DMFD): 16.24 g (0.0883 moles)
sebacic acid: 7.64 g (0.0378 moles)
1,4-butanediol: 15.63 g (0.177 moles)

A product was obtained with an inherent viscosity measured in chloroform at 25° C. (2 g/l) according to the ASTM standard D 2857-89 equating to 0.75 dl/g.

The product was analysed with a Perkin Elmer DSC7 scanning differential colorimeter, obtaining the following results:
$T_m$=122.1° C., $T_c$=60.6° C.,
$\Delta H_f$=19.8 J/g,
$\Delta H_c$=−18.6 J/g,
$T_g$=−13° C.

The $^1$H-NMR analysis (at 300 MHz) on the solution in CDCl$_3$ confirmed the content of aromatic units (68.9%) and a randomness index of 1.210.

The product was analysed by gel permeation chromatography (Agilent® 1100) using a refraction index detector. The eluent consisted of CHCl$_3$ with a flow of 1 ml/min. The system was thermostat-controlled at 40° C. A set of three columns in series was used, with a particle diameter of 5μ and a porosity of 500 Å, 1,000 Å and 10,000 Å, respectively.

The molecular weight was determined using polystyrene as a reference standard. ***

GPC trace: Mn=45125, Mw=88995 Mz=152373 Mw/Mn=1.9722.

Figure 1B:
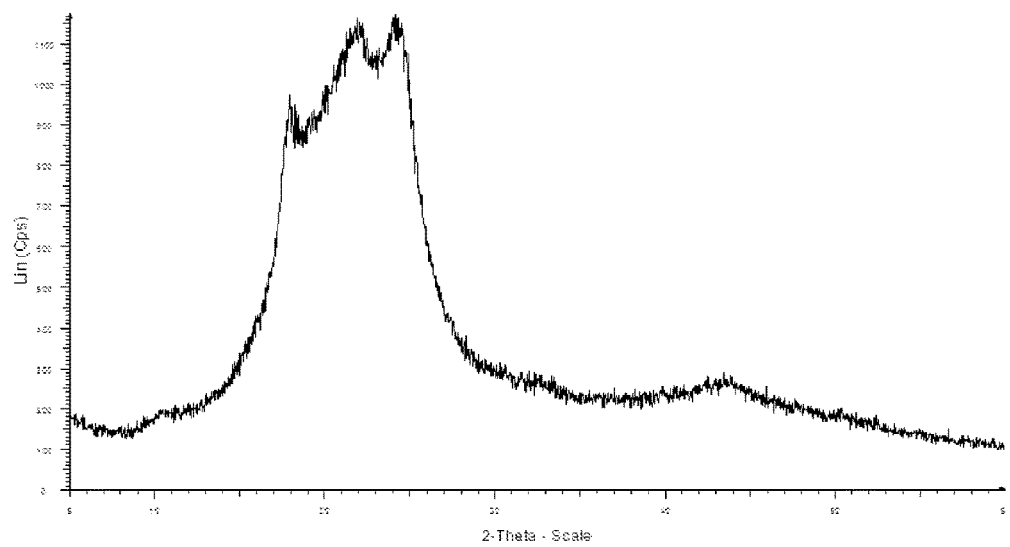
FIG. 1B shows the X-ray diffractogram of the polymer of Example 2.

The polyester showed a crystallinity of 12% as measured by x ray diffractometry. FIG. 1b shows the x ray diffractogram of the polymer.

The polymer was subsequently characterised in as much as concerned with mechanical properties according to the ASTM D638 standard. The tearing resistance is measured according to the standard ASTM D1922-89.

Mechanical Properties Under Tensile Stress:

| Yield stress (MPa) | 8.9 |
| Ultimate load (MPa) | 32.5 |
| Yield elongation (%) | 28 |
| Ultimate elongation (%) | 520 |
| Elastic modulus (MPa) | 110 |
| Ultimate energy (MJ/m³) | 115 |
| Tearing resistance | |
| Elmendorf (N/mm) | >50 |

EXAMPLE 3

63 parts by weight of the polymer of example 1 were blended with 5 parts of poly L-lactide polymer having a Mn of 130 000, MFR at 190° C., 2.16 kg of 3.5 g/10 min, a residue of lactide less than 0.2% and a D content of about 6%, 23.5 parts of starch, 3.5 parts of water and 5 parts of glycerol. The extruder used was a twin screw extruder Haake Rheocord 90 Rheomex TW-100. The thermal profile was ranging between 120 and 190° C. The final water content of the granules was equal to 0.8%

The granules were filmed on a 40 mm Ghioldi machine, die gap=1 mm, flow rate 20 kg/h to obtain film with a thickness of 20 μm.

The 20 μm films were then subjected to mechanical characterization according to the standard ASTM D882-88 (traction at 23° C. and 55%; Relative humidity and Vo=50 mm/min).

The results are indicated in Table 1 below.

EXAMPLE 4

80 parts by weight of the polymer of example 1 were blended with 20 parts of poly L-lactide polymer having a Mn of 130 000, MFR at 190° C., 2.16 kg of 3.5 g/10 min, a residue of lactide less than 0.2% and a D content of about 6%. The extruder used was a twin screw extruder Haake Rheocord 90 Rheomex TW-100. The thermal profile was ranging between 120 and 190° C. The final water content of the granules was equal to 0.8%

The granules were filmed on a 40 mm Ghioldi machine, die gap=1 mm, flow rate 20 kg/h to obtain film with a thickness of 20 μm.

The 20 μm films were then subjected to mechanical characterization according to the standard ASTM D882-88 (traction at 23° C. and 55%; Relative humidity and Vo=50 mm/min).

The results are indicated in Table 1 below.

EXAMPLE 5

70 parts by weight of the polymer of example 1 were blended with 27 parts of starch and 2.4 parts of water. The extruder used was a twin screw extruder Haake Rheocord 90 Rheomex TW-100. The thermal profile was ranging between 120 and 190° C. The final water content of the granules was equal to 0.8%.

The granules were filmed on a 40 mm Ghioldi machine, die gap=1 mm, flow rate 20 kg/h to obtain film with a thickness of 20 μm.

The 20 μm films were then subjected to mechanical characterization according to the standard ASTM D882-88 (traction at 23° C. and 55%; Relative humidity and Vo=50 mm/min).

The results are indicated in Table 1 below.

TABLE 1

| | MECHANICAL PROPERTIES | | | |
|---|---|---|---|---|
| Example | $\sigma_b$ (MPa) | $\epsilon_b$ (%) | E (MPa) | $En_b$ (kJ/m$^2$) |
| 3 | 26 | 411 | 251 | 3862 |
| 4 | 21 | 697 | 194 | 4698 |
| 5 | 28 | 591 | 209 | 5036 |

Biodegradation Test

For the products of Table 2 the biodegradation test was carried out in controlled composting according to the Standard ISO 14855—Amendment 1.

The tests were carried out on pellets ground in liquid nitrogen until they were fragmented to particles having diameter <250 μm. As positive control microcrystalline cellulose Avicel® for column chromatography lot No. K29865731 202 was used. Powder grain size: 80% between 20 μm and 160 μm; 20% less than 20 μm.

TABLE 2

| | BIODEGRADATION | | |
|---|---|---|---|
| Example | % aromatic | Relative biodegradation after 90 days | Relative biodegradation after 150 days |
| 1 | 59.9 | 91.6 | 97.6 |
| 2 | 68.9 | 78.7 | 91.2 |

The invention claimed is:

1. A biodegradable polyester of the aliphatic-aromatic type obtained from at least one aliphatic dicarboxylic acid or ester thereof, a diol and at least one polyfunctional aromatic acid or ester thereof, wherein said polyfunctional aromatic acid is 2,5-furan dicarboxylic acid of renewable origin, and said diol consists of 1,4-butanediol, the molecular weight $M_n$ of the polyester is between 5,000 and 150,000, and the amount of the 2,5-furan dicarboxylic acid or ester thereof is from 40% to 70% of the total molar content of dicarboxylic acids or esters thereof and the amount of the at least one aliphatic dicarboxylic acid or ester thereof is correspondingly from 60% to 30% of the total molar content of dicarboxylic acids or esters thereof, wherein said biodegradable polyester has a biodegradability greater than 90% after 150 days compared to the biodegradability of cellulose.

2. The biodegradable polyester according to claim 1, wherein the at least one aliphatic dicarboxylic acid is a $C_2$-$C_{22}$ acid.

3. The biodegradable polyester according to claim 2, wherein the at least one aliphatic dicarboxylic acid or ester thereof is selected from the group consisting of adipic acid and an acid originating from renewable sources.

4. The biodegradable polyester according to claim 3, wherein the at least one aliphatic dicarboxylic acid or ester thereof originating from renewable sources is a $C_8$-$C_{13}$ dicarboxylic acid or ester thereof.

5. The biodegradable polyester according to claim 3, wherein the at least one aliphatic dicarboxylic acid or ester thereof originating from renewable sources is selected from the group consisting of azelaic acid, sebacic acid, suberic acid, brassylic acid and their esters.

6. The biodegradable polyester according to claim 1, wherein the polyester has a polydispersity index $M_w/M_n$ between 1.4 and 8.

7. The biodegradable polyester according to claim 6, wherein the molecular weight $M_n$ of the polyester is between 10,000 and 120,000.

8. The biodegradable polyester according to claim 7, wherein the molecular weight $M_n$ of the polyester is between 20,000 and 100,000.

9. A blend of the biodegradable polyester according to claim 1, obtained by reactive extrusion, with at least one other biodegradable polymer of either natural or synthetic origin.

10. A blend according to claim 9, wherein the polymer of synthetic origin is selected from the group consisting of a biodegradable polyester or polymers other than polyesters.

11. A blend according to claim 9, wherein the polymer of natural origin is selected from the group consisting of starch, cellulose, chitin and chitosan, alginates, proteins, natural rubbers, rosinic acid and its derivatives, lignins and their derivatives.

12. A blend according to claim 11, wherein the starches and the celluloses are modified.

13. A blend according to claim 12, wherein the modified starches and celluloses are starch or cellulose esters with a degree of substitution between 0.2 and 2.5, hydroxypropylated starches, and modified starches with fatty chains.

14. A blend according to claim 11, wherein the starch is added in either destructured or gelatinised form, or as a filler.

15. A blend according to claim 14, wherein the starch represents the continuous or dispersed phase, or in co-continuous phase.

16. A blend according to claim 15, wherein the dispersed starch has dimensions smaller than one micron in mean diameter.

17. A blend according to claim 10, wherein the polymer of synthetic origin is polylactic acid and the polymer of natural origin is starch.

18. A method for the manufacture of:
- mono- and bi-oriented films, and films multilayered with other polymers;
- films for use in the agricultural sector;
- cling films for use with foodstuffs, for bales in agriculture, and for wrapping waste;
- bags and bin liners for the organic waste collection;
- thermo formed foodstuff packaging, both mono- and multi-layered;
- coatings obtained using the extrusion coating method;
- multilayer laminates with layers of paper, plastic, aluminum, or metallic films;
- expanded or expandable beads for the production of pieces obtained by sintering;
- expanded and semi-expanded products;
- foam sheets, thermosetting foam sheets, and containers obtained from them for use in foodstuff packaging;
- fruit and vegetable containers in general;
- composites with gelatinised, destructured and/or complexed starch, natural starch, flours, or vegetable or inorganic, natural fillers;
  - fibres, woven and nonwoven fabrics for use in sanitary and hygiene products, and in the agricultural and clothing sectors, which comprises shaping a polymeric composition according to claim 1.

19. The biodegradable polyester according to claim 1, wherein the content of the at least one aromatic dicarboxylic acid or ester thereof is between 40% and 60% of the total molar % of the dicarboxylic acids or esters thereof and wherein the polyester has a polydispersity index $M_w/M_n$ is between 1.6 and 5.

20. The biodegradable polyester according to claim 1, wherein the content of the at least one aromatic dicarboxylic acid or ester thereof is between 40% and 60% of the total molar % of the dicarboxylic acids or esters thereof.

21. The biodegradable polyester according to claim 1, which has a crystallinity greater than 5% and an inherent viscosity of between 0.3 and 2 dug.

* * * * *